United States Patent [19]

Grafton et al.

[11] 4,422,181
[45] Dec. 20, 1983

[54] BI-DIRECTIONAL FIBRE-OPTIC COUPLER

[75] Inventors: David A. Grafton, Santa Monica; Eric B. Hochberg, Pasadena; Ronald E. Purkis, Upland, all of Calif.

[73] Assignee: The United States of America as represented by the Secretary of the Army, Washington, D.C.

[21] Appl. No.: 181,495

[22] Filed: Aug. 26, 1980

[51] Int. Cl.³ .............................................. H04B 9/00
[52] U.S. Cl. ...................................... 455/606; 370/3; 455/610; 455/612
[58] Field of Search ............... 455/604, 605, 606, 607, 455/610, 612, 617; 350/96.15, 96.16, 96.18, 96.19; 370/3

[56] References Cited

U.S. PATENT DOCUMENTS

| | | | |
|---|---|---|---|
| 3,504,182 | 3/1970 | Pizurro et al. | 455/606 |
| 3,953,727 | 4/1976 | d'Auria et al. | 455/610 |
| 4,021,099 | 5/1977 | Kawasaki et al. | 350/96.18 |
| 4,154,529 | 5/1979 | Dyott | 350/96.18 |
| 4,207,561 | 6/1980 | Steensma | 455/612 |
| 4,262,362 | 4/1981 | Kiernan et al. | 455/612 |

FOREIGN PATENT DOCUMENTS 1429289 3/1976 United Kingdom ................ 455/604

OTHER PUBLICATIONS

Miller–Optically Powered Speech Communication Over A Fiber Light Guide–BSTJ–Sep. 1979, pp. 1735–1741.

Primary Examiner—Joseph A. Orsino, Jr.
Attorney, Agent, or Firm—William G. Gapcynski; Werten F. W. Bellamy; James T. Deaton

[57] ABSTRACT

A bi-directional fibre-optic coupler providing about 70 dB to about 100 dB isolation from near end transmitter radiation in a system that transmits signals in opposite directions over a single fibre and thereby provides a low-loss coupler having operational characteristics to handle reception and transmission with sufficiently low value of crosstalk.

3 Claims, 2 Drawing Figures

BI-DIRECTIONAL FIBRE-OPTIC COUPLER

DEDICATORY CLAUSE

The invention described herein may be manufactured, used, and licensed by or for the Government for governmental purposes without the payment to us of any royalties thereon.

BACKGROUND OF THE INVENTION

The advantages of fibre-optic communication systems with high bandwidth capability and link security are recognized. In many such systems, the use of single fibers have a tremendous economic impact for long-distance communications. The development of airborne fibre-optic systems projects applications using a single fibre that can be "payed-out" and establishes two-way communication with an active system. The single fibre is a necessity from the standpoint of pay-out characteristics, payload, and maximization of length. However, to establish this communication, bi-directional couplers that allow simultaneous transmission and reception of the optical signals are required at each end of the transmission fibre.

Therefore, it is an object of this invention to provide a bi-directional coupler for fibre-optic transmission over a single two-way fibre.

Another object of this invention is to provide a bi-directional coupler with good isolation from near-end transmitter crosstalk radiation.

Still another object of this invention is to provide a bi-directional coupler which has capability of high band width and full duplex operation on a single fibre.

Other objects and advantages of this invention will be obvious to those skilled in this art.

SUMMARY OF THE INVENTION

In accordance with this invention, a bi-directional fibre-optic coupler is provided which includes an emitter source which emits radiation and is collected by collection optics that collect flux emerging from the emitter and transmits a collimated beam for input into focusing optics that transmit a narrow beam through a pinhole in a mirror and onto an end surface of a single fibre for transmitting the signal to a remote or far-end of the fibre. A second signal at the far-end at a different wavelength is transmitted through the single fibre and emergers from the end of the fibre and is reflected off a surface of the mirror that has the pinhole therethrough and onto detector optics for focusing the second transmitted signal onto a detector for this signal and also passing the second signal through a bandpass filter to filter out undesirable radiation such as crosstalk from the first transmitter and undesirable radiation from scattering mechanisms within the bulk of the fibre before being transmitted to the detector.

DESCRIPTION OF THE PREFERRED EMBODIMENT

Figure 1:
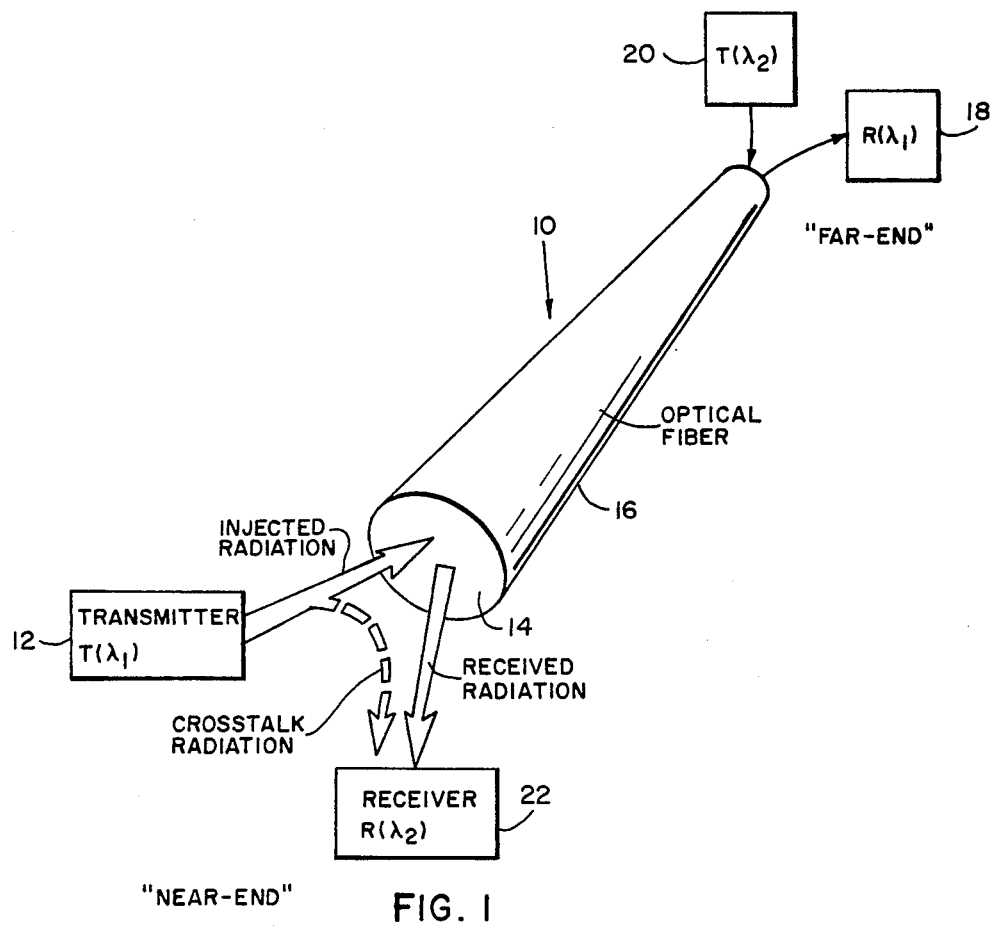
FIG. 1 is a schematic view of a system using a bi-directional coupler in accordance with this invention.

Referring now to FIG. 1, a bi-directional coupler system 10 includes a first transmitter 12 which transmits at frequency $\lambda_1$ and injects its radiation into flat end surface 14 of single optical fibre 16 and the injected radiation is detected at the far-end of fibre 16 by detector 18. Similarly, a second transmitter 20 transmits radiation at a second frequency $\lambda_2$ which is injected into the far-end of optical fibre 16 and emerges through end face 14 of optical fibre 16 onto receiver or detector 22 for detecting the $\lambda_2$ radiation. This system is made to function acceptably by using a bi-directional coupler as depicted in FIG. 2.

Figure 2:
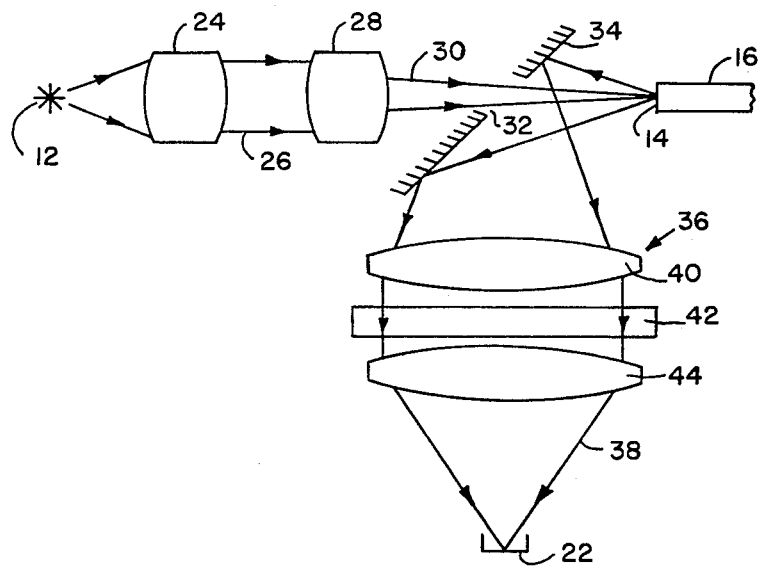
FIG. 2 is a schematic illustration of a bi-directional coupler in accordance with this invention.

Referring now to FIG. 2, transmitter 12 such as a semi-conductor laser emitting relatively monochromatic radiation centered at wavelength $\lambda_1$ transmits its radiation to collection optics 24 which collect as much flux emerging from emitter 12 as possible and form a collimated beam 26 which is input to focusing optics 28. Collection optics 24 is of a conventional structure which collects energy efficiently and focusing optics 28 can be a commercially available f/50 telephoto system. Focusing optics 28 provide a narrow, near collimated beam 30 which is focused on end surface 14 of fibre 16. Fibre 16 can have a core diameter of about 62.5 micron and end surface 14 is a flat polished surface. The energy in beam 30 before striking end surface 14 is passed through pinhole 32 of a diameter of about 0.050 inches that is located in mirror 34. Mirror 34 has a reflective surface as illustrated that is located at a 45° inclination relative to flat end surface 14 of fibre 16. Mirror 34 can be an aluminized, quarter wave, first-surface, pyrex mirror that is an off-the-shelf item with reflectance generally exceeding 0.90 in the infrared. In practice, the center of pinhole 32 is positioned approximately 1 inch from end surface 14 of fibre 16. With this arrangement, a portion of the energy in beam 30 that is focused on end surface 14 of fibre 16 is reflected at end surface 14 of fibre 16 that is refocused through pinhole 32 and back toward the source. As such, this energy is out of the field of view of detector 22, the scattered energy in the fibre itself that is emitted over its angle associated with its numerical aperture is the only appreciable energy that strikes the mirror surface of mirror 34 and is directed toward detector 22. The usable reflective surface area of mirror 34 in the ratio to the pinhole area results in less than a 2% loss of energy emitted over the fibre's numerical aperture angle. Laser energy 20 transmitted from the far end of fibre 16 at $\lambda_2$ emerges at the near end over the numerical aperture of fibre 16 and a 2% loss is imposed by pinhole 32. The remainder of the transmitted energy $\lambda_2$ is reflected off the mirror surface of mirror 34 and to detector and filtering optic means 36 before being transmitted as a beam 38 onto detector 22. Detector and filter optic means 36 include first conventional structure optic lens 40 for collimating the reflected energy from the mirror surface of mirror 34 and provide normal infringement on bandpass filter means 42 and then pass the collimated energy through optics 44 to focus the energy onto detector 22. Each stage of filtering means 42 provides a 38 dB rejection of $\lambda_1$ while maintaining a transmission of $\lambda_2$ of greater than 80%. Two stages of band-pass filtering means 42 along with 40 dB of geometric isolation results in an overall effect of greater than 100 dB crosstalk rejection while maintaining an insertion loss that is the product of the transmission of each filter stage, the transmission of the lenses in detection optic means 36 and the surface loss at mirror 34. This total is approximately 2.5 dB. For a system employing a single filter stage 42 (approximately 78 dB crosstalk rejection) the insertion loss of the coupler for the far-end radation is approximately 1.5 dB. Optics 40, 44 of detector and filter optic means 36 are a fast system of a f/2.38 system which is used to collect all the flux emerging from fibre end 14 and for simplicity, the optical means is composed of a symmetrical pair of dublets. Using this system, the energy in beam 38 is focused to a spot with a diameter of 0.422 mm diameter and detector 22 has an active detector diameter 0.8 mm. A detector of this type that can be used is an RCA C30819-temperature compansated silicon avalanche photodiode with pre-amplifier module. The detector optic portion of detector and filter optic means 36 serves two basic functions: first, to collect all the radiation emerging within the numerical aperture of fibre 16 and relay this to detector 22 and secondly, to form a collimated beam in which bandpass filter means 42 can be placed for optimum performance. "Optimum performance" includes maximum transmission of radiation from far-end emitter 20 and simultaneously, maximum attenuation of radiation from near-end emitter 12. Bandpass filter means 42 can be of various available filter means, however applicants used a single 841 nm pass bandpass filter between optics 40 and 44 in the collimated region as illustrated. If desired, an additional or second bandpass filter stage can be placed in series with a first stage to provide additional isolation of the undesirable crosstalk.

In theory of operation, this arrangement has originated primarily as a consequence of investigation into the nature of crosstalks sources. (Crosstalk here refers to all radiation in the "near-end" transmitters' spectrum which appears in the output of the "near-end" receiver).

Simply, the major crosstalk components identified fall into two categories. Crosstalk power originating at the fibre/air interface and crosstalk power originating from within the bulk of fibre 16.

The first component is believed to result from a Fresnel reflection at the fibre/air interface whence a crosstalk power level ~14dB below the injected power level derives. With no geometric isolation, this component is entirely within the field of view of the detector. The second component is attributed to Rayleigh scattering mechanisms within the bulk of the fibre and can be shown to account for a crosstalk power level ~40db below the injected power level. As this component emerges from the fibre in a manner identical to the emerging radiation desired to be detected, it can only be suppressed by spectral means. The first component however can be isolated by geometric/spatial means. That is, emitter radiation, formed into a near-collimated beam of diameter approximating the diameter of the fibre core, upon reflection at the fibre/air interface, is arranged to pass back through the pinhole and thereby out of the field of view of the detector. Compared to the solid angle associated with the emerging radiation within the numerical aperture of the fibre, the pinhole subtends only a small portion of the emerging radiation, incurring a commensurately small signal loss. Therefore, it can be seen that applicants' arrangement augments the spectral suppression provided by the bandpass filter means with geometric isolation. That is, if the emitter radiation is injected in the form of a near-collimated beam of size compariable to the filter core diameter, at normal incidence, the Fresnel reflection component in principle is arranged to pass back through the pinhole and thereby out of the field of view of the detector. The fraction that does not pass through the pinhole is, of course, within the field of view of the detector, but is subject to the spectral suppression provided by the bandpass filter means that is located downstream.

We claim:

1. A bi-directional coupler comprising an emitter source for emitting energy, collection and focusing optic means mounted for collecting energy from the emitter source and transmitting the energy in a narrow beam, a mirror having a reflective surface and a pinhole aperture therethrough and being mounted for passing said narrow beam through said pinhole aperture and to a flat and polished end surface of a fibre optic mounted normal to said narrow beam for receiving said narrow beam, said mirror surface being inclined relative to the end surface of said fibre optic for reflecting a second source of energy emanating from the end surface of said fibre optic, and detector and filter optic means mounted for receiving reflected sound source energy from the reflective surface of the mirror and filtering out undesirable energy and focusing the remainder of the energy onto a detector mounted for reception thereof, said collection and focusing optic means including collection optics that collect as much flux from said emitter source as possible and transmits this flux as a collimated light means to focusing optics of said collection and focusing optic means, said focusing optics producing said narrow beam as a narrow, near collimated beam that is transmitted to said end surface of said fibre, and said flat and polished end surface being positioned about one inch from said pinhole aperture, whereby a portion of said narrow, near collimated beam is reflected back upon itself toward said emitter source, through said pinhole aperture and out of the field of view of said detector.

2. A bi-directional coupler as set forth in claim 1, wherein said detector and filter optic means include a first lens that converts the reflected second source energy to collimated light and passes the collimated light through a bandpass filter to a second lens that focuses said collimated light onto said detector.

3. A bi-directional coupler as set forth in claim 1, wherein said second source of energy eminating from the end surface of said fibre is at a different wavelength from said emitter source, and said detector and filter optic means include a bandpass filter that passes said second source of energy and filters out energies of other wavelengths.

* * * * *